United States Patent
Schubert et al.

(10) Patent No.: US 12,005,799 B2
(45) Date of Patent: Jun. 11, 2024

(54) METHOD AND DEVICE FOR CHARGING AN ELECTRIC VEHICLE

(71) Applicant: Fronius International GmbH, Pettenbach (AT)

(72) Inventors: Michael Schubert, Pettenbach (AT); Markus Brandstoetter, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 556 days.

(21) Appl. No.: 17/283,329

(22) PCT Filed: Jan. 10, 2020

(86) PCT No.: PCT/EP2020/050478
§ 371 (c)(1),
(2) Date: Apr. 7, 2021

(87) PCT Pub. No.: WO2020/144301
PCT Pub. Date: Jul. 16, 2020

(65) Prior Publication Data
US 2022/0001765 A1 Jan. 6, 2022

(30) Foreign Application Priority Data

Jan. 10, 2019 (AT) .............................. A 50018/2019
May 15, 2019 (EP) ..................................... 19174686

(51) Int. Cl.
*B60L 53/53* (2019.01)
*B60L 53/30* (2019.01)
(Continued)

(52) U.S. Cl.
CPC ............. *B60L 53/62* (2019.02); *B60L 53/305* (2019.02); *B60L 53/51* (2019.02); *B60L 53/63* (2019.02);
(Continued)

(58) Field of Classification Search
None
See application file for complete search history.

(56) References Cited

U.S. PATENT DOCUMENTS 8,509,957 B2   8/2013   Tsuchiya
8,872,480 B2  10/2014   Deboer et al.
(Continued)

FOREIGN PATENT DOCUMENTS

CN   104080642 A   10/2014
CN   104160546 A   11/2014
(Continued)

OTHER PUBLICATIONS

Chinese Office Action dated May 5, 2023 in Chinese Application No. 202080005783.6, with English translation.
(Continued)

*Primary Examiner* — Richard Isla
*Assistant Examiner* — Javier A. Bernal Sosa
(74) *Attorney, Agent, or Firm* — Collard & Roe, P.C.

(57) ABSTRACT

In a method and a device for charging an electric vehicle with a charging current, having: a connection for connecting to a domestic mains supply connected to a power generating plant, a power supply grid, an energy management device, and possibly an energy storage; a charging connection for connecting to the electric vehicle (11) to be charged; and a control device for controlling the charging current for charging the electric vehicle, at least one device determines the surplus power of the domestic mains supply and the power drawn from the power supply grid and compares them with at least one activation threshold and/or deactivation threshold. The control device is designed so that the charging current for charging the electric vehicle is according to the at least two preset charging currents, by activating or deactivating the corresponding preset charging current when
(Continued)

upon reaching the corresponding activation threshold values or deactivation threshold values.

12 Claims, 4 Drawing Sheets

(51) Int. Cl.

| | | |
|---|---|---|
| *B60L 53/51* | (2019.01) | |
| *B60L 53/62* | (2019.01) | |
| *B60L 53/63* | (2019.01) | |
| *B60L 53/64* | (2019.01) | |
| *B60L 53/68* | (2019.01) | |
| *H02J 1/14* | (2006.01) | |
| *H02J 3/32* | (2006.01) | |
| *H02J 3/38* | (2006.01) | |
| *H02J 7/00* | (2006.01) | |
| *H02J 7/02* | (2016.01) | |
| *H02J 7/34* | (2006.01) | |
| *H02J 7/35* | (2006.01) | |

(52) U.S. Cl.
CPC .............. *H02J 3/322* (2020.01); *H02J 3/381* (2013.01); *H02J 7/0047* (2013.01); *H02J 7/02* (2013.01); *H02J 7/35* (2013.01); *H02J 2300/24* (2020.01)

(56) References Cited

U.S. PATENT DOCUMENTS

| | | | |
|---|---|---|---|
| 10,559,046 B2 | 2/2020 | Hirata et al. | |
| 2011/0004358 A1* | 1/2011 | Pollack | B60L 53/665 700/297 |
| 2011/0047102 A1 | 2/2011 | Grider et al. | |
| 2011/0313603 A1* | 12/2011 | Laberteaux | H01M 10/48 705/412 |
| 2012/0212050 A1 | 8/2012 | Takehara | |
| 2012/0249065 A1* | 10/2012 | Bissonette | B60L 53/665 320/109 |
| 2012/0277923 A1 | 11/2012 | Tsuchiya | |
| 2015/0165917 A1* | 6/2015 | Robers | B60L 3/12 320/109 |
| 2016/0276842 A1* | 9/2016 | Shizuno | B60L 53/14 |
| 2017/0008416 A1 | 1/2017 | Endo et al. | |

FOREIGN PATENT DOCUMENTS

| | | |
|---|---|---|
| CN | 105324884 A | 2/2016 |
| CN | 106233563 A | 12/2016 |
| CN | 107077705 A | 8/2017 |
| CN | 107346908 A | 11/2017 |
| CN | 108988430 A | 12/2018 |
| CN | 109017389 A | 12/2018 |
| DE | 10 2012 202 465 A1 | 8/2012 |
| DE | 10 2011 089 230 A1 | 4/2013 |
| EP | 3 016 237 A1 | 5/2016 |
| JP | 2012-005168 A | 1/2012 |
| WO | 2013/023694 A1 | 2/2013 |
| WO | 2013/100764 A1 | 7/2013 |

OTHER PUBLICATIONS

International Search Report in PCT/EP2020/050478, mailed Apr. 8, 2020.
Austrian Search Report in A 50018/2019, dated Aug. 13, 2019, with English translation of relevant parts.
European Search Report in EP 19174686.6-1205, dated Nov. 29, 2019, with English translation of relevant parts.
Notification of Transmittal of Translation of the International Preliminary Report on Patentability in PCT/EP2020/050478 mailed Jul. 22, 2021, with English translation of the International Preliminary Report on Patentability dated Jun. 16, 2021, and English translation Written Opinion of the International Searching Authority dated Apr. 8, 2020.
Second Chinese Office Action dated Oct. 20, 2023 in Chinese Application No. 202080005783.6, with English translation.

* cited by examiner

METHOD AND DEVICE FOR CHARGING AN ELECTRIC VEHICLE

CROSS REFERENCE TO RELATED APPLICATIONS

This application is the National Stage of PCT/EP2020/050478 filed on Jan. 10, 2020, which claims priority under 35 U.S.C. § 119 of Austrian Application No. A 50018/2019 filed on Jan. 10, 2019 and European Application No. 19174686.6 filed on May 15, 2019, the disclosures of which are incorporated by reference. The international application under PCT article 21(2) was not published in English.

BACKGROUND OF THE INVENTION

1. Field of the Invention

The invention relates to a method for charging an electric vehicle with a charging current from a domestic mains supply connected to a power generating plant, a power supply grid, an energy management device, and possibly an energy storage, wherein the charging current for charging the electric vehicle is controlled by a control device, and the control device is connected to the energy management device, and at least two charging currents are preset for the control device, and the electric vehicle is charged with a charging current which is provided according to one of the at least two preset charging currents under the control of the energy management device, wherein an activation threshold value and a deactivation threshold value are defined for each of the at least two preset charging currents.

Furthermore, the invention relates to a device for charging an electric vehicle with a charging current, having a connection for connecting to a domestic mains supply connected to a power generating plant, a power supply grid, an energy management device, and possibly an energy storage, having a charging connection for connecting to the electric vehicle to be charged, and having a control device for controlling the charging current for charging the electric vehicle, and the control device is designed to connect to the energy management device, and at least two charging currents can be preset so that the charging current for charging the electric vehicle is provided according to one of the at least two preset charging currents under the control of the energy management device, wherein an activation threshold value and a deactivation threshold value can be defined for each of the at least two preset charging currents.

2. Description of the Related Art

Batteries of an electric vehicle, a plug-in hybrid vehicle or other vehicles in which major charging currents flow (hereafter designated collectively as an electric vehicle), are now only rarely charged using Schuko sockets, since these cannot withstand high charging currents over long periods and therefore only allow low charging powers. Increasingly, permanently installed charging stations, so-called wall boxes, are being used for connecting the electric vehicle using a charging cable, ideally with an in-cable control box (ICCB), to a so-called type 1 or type 2 charging plug.

In many cases, operators of a renewable power generating plant are also operators of an electric vehicle and prefer to supply the vehicle with the energy they generate themselves as far as possible, for environmental reasons and not least for economic reasons. If renewable power generating plants do not themselves already exhibit unavoidable power fluctuations, these will occur anyway due to consumers being switched on and off. Depending on the maximum output of the renewable power generating plant and the associated consumers, power is either fed into a power supply grid or drawn from the power supply grid, so-called grid extraction. One way to better cover the power consumption with self-generated current is by switching consumers on and off or by regulating their power consumption. For example, the power of a photovoltaic system can be used for charging an energy storage instead of being fed into the power supply grid.

The document US 2015/0165917 A1 describes a method and a device for charging an electric vehicle of the relevant type, wherein the charging of multiple electric vehicles is distributed and regulated according to the available energy and the respective energy demand.

Energy management devices are also known from the prior art, which reduce infeed and grid extraction by switching consumers on and off. Due to the low feed-in tariffs and the comparatively high tariffs for grid extraction, this can increase the cost-effectiveness of a renewable power generating plant.

It is also known that energy management devices in this form can switch charging stations for charging electric vehicles in or out via an enabling input provided at the charging station for this purpose. This is the simplest variant of a charging controller. There are also charging stations which have a continuously variable regulation of the charging current in order to adapt the consumption as precisely as possible to an existing surplus power of a renewable power generating plant. Such charging stations are associated with comparatively high procurement costs due to the higher technical complexity. Especially in renewable power generating plants with fairly low nominal power, such as those found in the domestic sector, these charging stations are often operated in power ranges in which the regulation cannot be applied optimally, because this would result in a charging current below a minimum charging current for an electric vehicle. For example, if a minimum charging current of 6 A is converted to power, a minimum charging power of 1.38 kW is obtained for a single-phase charge of 230V. For three-phase charging, the minimum charging power is 4.14 kW. Especially in small systems, these lower limits of the charging power make it more difficult to regulate the charging of an electric vehicle according to an energy surplus of a power generating plant. There are also older electric vehicles that require higher minimum charging currents (e.g. 12 A), which means the control range for the charging power starts at higher values (e.g. single-phase: 2.76 kW). Similarly, only charging stations that can be switched in and out are restricted if a somewhat larger power range is to be covered.

At present, the domestic charging of electric vehicles is limited to alternating-current charging, or AC charging. Direct-current charging or DC charging is currently only used in charging stations with high charging power levels, which in view of the procurement costs for home use are neither economic nor necessary, for reasons of the charging time. New electric vehicles with relatively high ranges (e.g. >250 km) still offer sufficient reserves even for long working distances (e.g. 100 km), to allow evening journeys without problems. An urgent rapid charge is therefore not necessary in normal circumstances. The electric vehicle can be charged overnight at low charging power or in a manner optimized to the surplus power. In really urgent cases, there is already a relatively dense network of DC rapid charging stations (depending on the region), in which high amounts of energy can be transferred within a short time. The owner of the electric vehicle drives to the rapid charging station, in a similar way to refuelling with fossil fuels, and charges the electric vehicle there within minutes.

Charging stations are usually installed at fixed locations, with various protective devices and communication devices integrated in the charging station itself. By means of functions such as RFID (Radio Frequency Identification; for authentication) and communication standards such as OCPP (Open Charge Point Protocol; e.g. for billing), charging stations can also be used in semi-public or public areas. Depending on the design, charging stations are available with a permanently connected cable or a socket for connecting a charging cable.

In the communication between the charging station or charging cable with control box (ICCB cable) and the electric vehicle, no further information is exchanged other than the charging status, the possibility of starting or stopping the charge, and the specification of a maximum charging current. The target specification of the charging current is limited by standards to a range between 6 A and 80 A. Between 0 A and 6 A there is no control option. The charge is either stopped or specified with at least 6 A.

In order to control the charging power of the electric vehicle, the charging station communicates a specification for the maximum charging current. The electric vehicle receives this specification from the charging station and sets the actual charging current accordingly. How quickly and exactly the target specification of the charging station is met by the electric vehicle depends on the manufacturer of the respective electric vehicle. However, settling times are usually in the range of a few seconds and target power deviations are in the 100 W range.

Low charging powers with relatively long charging times offer the advantage that the personal consumption of power from a renewable power generating plant can be used more effectively and that the entire charging infrastructure (power supply grid, domestic mains supply, charging station, electric vehicle) is less heavily loaded. The battery of the electric vehicle is thus protected and its lifetime is extended. Energy costs can be reduced primarily by increasing the proportion of personal consumption. In the future, power-dependent grid tariffs will probably also be extended to the domestic sector. As a result, high charging powers will lead to significantly higher electricity costs.

SUMMARY OF THE INVENTION

The object of the present invention is to create an above-mentioned method and an above-mentioned device for charging an electric vehicle, which allow an optimum utilization of the power of a power generating plant and thus a particularly cost-effective and economical charging of the electric vehicle. The method and the device should be as simple and cost-effective as possible to implement, and allow a simple implementation. The disadvantages of the prior art described above are to be avoided or at least reduced.

The object according to the invention is achieved in relation to the method by the charging current for charging the electric vehicle being selected from the at least two preset charging currents by determining the surplus power of the domestic mains supply and the power drawn from the power supply grid, and comparing them with at least one activation threshold value and/or deactivation threshold value each, and when the corresponding activation threshold values or deactivation threshold values are reached the corresponding preset charging current is activated or deactivated, wherein the determined surplus power of the domestic mains supply is compared with the activation threshold values and the determined amount of power drawn from the power supply grid is compared with the deactivation threshold values, and the corresponding preset charging current is activated or deactivated. The charging method according to the invention achieves an economically optimal charging of the electric vehicle, taking into account the power conditions in the domestic power supply grid. The method is particularly simple, because existing components are used and no special communication devices are required between the components, which could increase costs and reduce reliability. With little effort, the power supply for the electric vehicle is increased or decreased in a staged manner using the preset charging currents. This enables a more precise regulation of the charging current than with simple switching of the charging current on and off and requires less technical complexity than a continuously variable charging station. Instead of preset charging currents, in an equivalent manner charging power levels could also be preset and the charging of the electric vehicle could be performed on the basis of these at least two different preset charging powers according to the energy management of the domestic mains supply. The functional principle of this stepped control of the charging current or charging power can be applied in an advantageous way to 1, 2 and 3-phase connection of the charging device. The stepped control for the power supply can be used for alternating current, direct current, or wired and inductive energy transmission. Only one preset charging current can ever be used by the control device of the charging device to charge the electric vehicle, or else a sum or a difference or a combination of sum and difference can be formed from two or more preset charging currents and specified to the electric vehicle. In addition to such cumulative preset charging currents, there are other ways of ultimately achieving a gradation of the preset charging currents. In principle, the approach taken in this invention always involves a gradation of the range between minimum and maximum charging current of a charging device in accordance with the energy management of the domestic mains supply. The advantage of the gradation results from the fact that a data exchange between the charging device and the energy management is redundant, since the control device of the charging device already knows the actual values and hence simple control signals are sufficient to control the charging device. Since the energy management device can only activate preset charging currents in the charging device, no impermissibly high charging currents can occur. In the same way, a charging device can also specify and preset negative charging currents in order to supply energy from the electric vehicle to another consumer, or to feed it into the domestic mains supply or power supply grid. The latter is known as "vehicle-to-grid". For example, the minimum charging current of the electric vehicle is set as the lowest preset charging current, and the maximum technically available charging current is set as the highest preset charging current. The range of values between the lowest and highest preset charging current can be further resolved in a graduated form. In a minimal variant, the electric vehicle could be charged with only two preset charging currents. In practice, with more than 20 levels no further significant increase in economic efficiency is to be expected, and satisfactory results are already achieved with three levels, for example. A preset minimum charging current of 0 Amperes for deactivating the supply of energy is not necessary, but is possible. The activation and deactivation thresholds are, in particular, power or current values. The fixed activation and deactivation threshold values are compared with the energy or current values determined in the energy management device and the result of the comparison is used as a basis for deciding which preset charging current will be provided for charging the electric vehicle. For a stable control, an average value over a certain period of time, for example 5 minutes, is preferably used as the value of the energy or power determined.

Alternatively, the power supplied to the power supply grid can also be compared with the activation threshold values and with the deactivation threshold values and the corresponding preset charging current activated or deactivated, or the determined amount of power drawn from the power supply grid can be compared with the activation threshold values and with the deactivation threshold values, and the corresponding preset charging current then activated or deactivated. This variant is particularly suitable for safely excluding grid extraction for the charging process. In addition, the variant is suitable for generally permitted grid extraction if this is only to be limited in terms of its level, in order to safely limit power peaks for which the operator of a power supply grid can charge higher tariffs. In the case in which grid extraction is charged separately for each phase, the energy management can be directed to minimizing the grid extraction per phase.

The charging of the electric vehicle is preferably stopped when the determined amount of power drawn from the power supply grid exceeds the deactivation threshold of the lowest preset charging current.

The activation of a preset charging current can be maintained over a selectable minimum time, which can be a few minutes, for example. This measure prevents frequent switching of the levels of the charging current between the individual preset charging currents, which would be detrimental when charging a battery of an electric vehicle and could reduce the battery life. A typical minimum time can be in the range of a few minutes, for example, 15 minutes.

If, according to another variant of the method according to the invention, a time window is set and the charging current for charging the electric vehicle is provided as one of the at least two preset charging currents, taking into account the set time window, the charging process can be even further optimized and a particularly inexpensive charging of the electric vehicle can be performed. By defining such a time window, for example, a safety charge can also be set to ensure an adequate charging of the electric vehicle even in the event of insufficient power being generated (for example, on days with bad weather if the power generating plant is a photovoltaic system). By providing time windows, for example, it is possible to define a later charging start time, a charge for ensuring a specific range of the electric vehicle, or even charging the electric vehicle specifically at times with inexpensive electricity tariffs.

It can be further provided that an operating mode is switched to one in which the electric vehicle is charged with a fixed predefined charging current, and/or to an operating mode for deactivating the supply of power. A user of the charging procedure according to the invention has the option, for example, to carry out a rapid charging procedure with a maximum possible charging current independently of economic aspects, or else to completely deactivate the charging procedure. For example, it is possible to switch between three operating modes, namely 1. the economic charging according to the invention, taking account of the energy management (energy management control),
2. charging with a fixed preset charging current with no consideration of economic aspects (immediate charging), and finally
3. stopping a charging procedure.

Switching between different operating modes can be performed in a particularly simple way, for example, using a key switch, and hence without the use of a computer or smartphone.

The charging current for charging the electric vehicle can also be controlled remotely. By using a remote control (wired or wireless) or an app on a smartphone, the user can make the settings more conveniently and from any desired location.

The object according to the invention is also achieved by at least one device mentioned above for charging an electric vehicle or charging station, wherein at least one device is provided for determining the surplus power of the domestic mains supply and the power drawn from the power supply grid and comparing them with at least one activation threshold and/or deactivation threshold, and the control device is designed so that the charging current for charging the electric vehicle is provided in accordance with the at least two preset charging currents by activating or deactivating the corresponding preset charging current when the corresponding activation threshold values or deactivation threshold values are reached. The charging device can be used in many different systems, in particular in older power generating plants, such as photovoltaic systems or wind turbines. By integrating energy management devices present in the domestic mains supply into the charging process, optimal utilization of energy resources can be achieved. Energy management devices can be, for example, inverters of existing photovoltaic systems, electricity meters in the domestic mains supply or smart meters, which have the corresponding information about the energy currently being generated, energy consumed and any energy supplied to the power supply grid, as well as the charge state of any additional energy storage present. By appropriately adjusting the settings in the charging device and, if present, the energy management device, rapid adjustments to changes in the domestic mains supply can be made (for example, an increase in the installed performance of a power generating plant, changed conditions of a power supply grid, etc.).

Preferably, a changeover device is provided for switching over to an operating mode for charging the electric vehicle with a fixed predefined charging current and/or to an operating mode for deactivating the supply of power. As already mentioned above, this allows the charging station to be switched over to different operating modes. As already mentioned above in connection with the method, it is thus possible, for example, to switch between three different operating modes together with the economic charging according to the invention.

The control device of the charging device can be designed for connecting to an inverter of a photovoltaic system, which forms the energy management device. Thus, the information about the energy generated and fed into the grid by a photovoltaic system is provided by an existing inverter as an energy management device.

As an alternative, an electricity meter or a smart meter of the domestic mains supply can provide the information necessary for the economic charging of the electric vehicle as the energy management device.

If a device is provided for selecting a time window so that the charging current for charging the electric vehicle is provided in a manner that takes the selected time window into account, an even more optimal charging of the electric vehicle can take place during the available time window.

BRIEF DESCRIPTION OF THE DRAWINGS

The invention will be explained in further detail by reference to the attached drawings. Shown are.

DETAILED DESCRIPTION OF THE PREFERRED EMBODIMENTS

Figure 1:
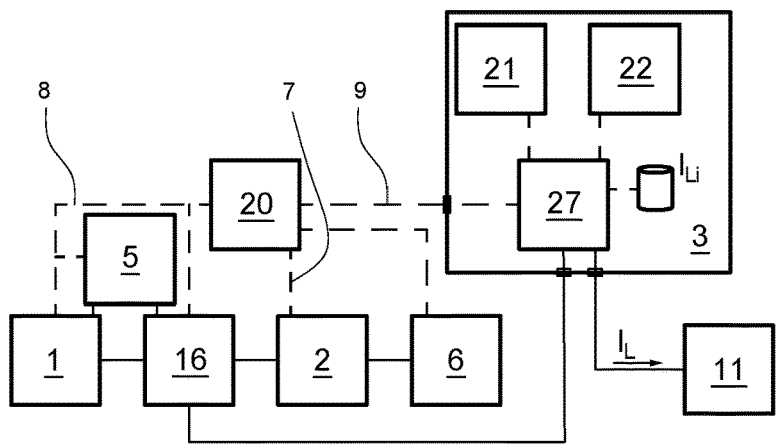
FIG. 1 a block circuit diagram of a device for charging an electric vehicle in a domestic mains supply in a general form.

FIG. 1 shows a block circuit diagram of a first design of a charging device 3 for charging an electric vehicle 11 in a domestic mains supply 16 in a general form. A public power supply grid 6 is supplied with electrical energy from appropriate electricity generating plants by energy supply companies. A connection point of the power supply grid 6 can be used to connect to the domestic mains supply 16. In the domestic mains supply 16, the customer's own power generating systems 1, such as a photovoltaic system, can be connected. Optionally, an energy storage 5 can be provided.

Usually, the energy management of the domestic mains supply 16 and/or power supply grid 6 is operated via a component which is generally referred to here as an energy management device 20. The energy management device 20 can be an existing electricity meter 2 or smart meter arranged between the domestic mains supply 16 and the power supply grid 6, as well as an inverter of a photovoltaic system as a power generating plant 1, or another module.

The charging device 3 is connected to the domestic mains supply 16 for charging the battery of the electric vehicle 11. For this purpose, the output of the charging device 3 is connected to the electric vehicle 11 with an appropriate charging cable 10. The charging process is appropriately controlled via a control device 27. The control device 27 of the charging device 3 is connected to the energy management device 20 so that the charging of the electric vehicle 11 can take place in a manner that takes into account the energy conditions in the domestic mains supply 16.

The charging current $I_L$ for charging the electric vehicle 11 is provided from at least two preset charging currents $I_{Li}$ under the control of the energy management device 20. The charging currents $I_{Li}$ are preset using the corresponding adjustment devices 21, 22. The electric vehicle 11 is charged in an economically optimal, graduated manner with different default values for the current amplitudes of the charging current. These preset charging currents $I_{Li}$ are determined, for example, by a specialist as part of the installation of the charging device 1. The preset charging currents $I_{Li}$ can be quickly adapted to the existing domestic mains supply 16 and the electric vehicle 11 and adjusted accordingly. Depending on the energy situation in the domestic mains supply 16 or on the information from the energy management device 20, one of the preset charging currents $I_{Li}$ is provided by the control device 27 of the charging device 3 and used for charging the electric vehicle 11. The control device 27 of the charging device 3 transmits the preset charging current $I_{Li}$ selected by the energy management device 20 to the electric vehicle 11, which is connected via the charging cable 10 using standardized communication techniques. The electric vehicle 11 evaluates the charging current $I_{Li}$ communicated by the control device 27 as the maximum charging current that can be drawn from the electric vehicle 11. Normally, an electric vehicle 11 does not exceed the communicated maximum charging current of a charging device 3.

Figure 2:
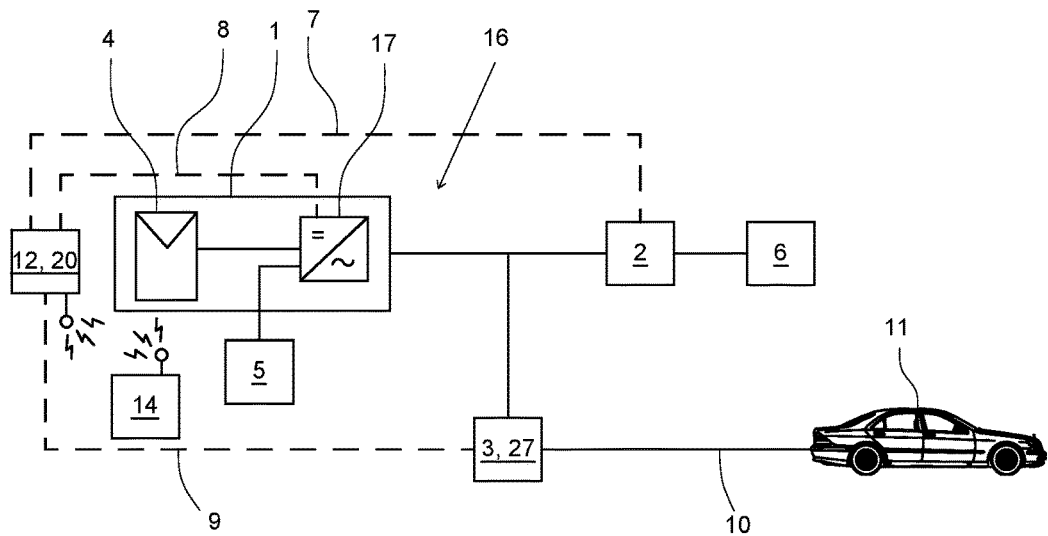
FIG. 2 a block circuit diagram of a first design of a device for charging an electric vehicle in a domestic mains supply.

In the design variant according to FIG. 2, the energy management device 20 is formed by an energy management box 12. The domestic mains supply 16 contains the energy management box 12, which is connected to an electricity meter 2 and an inverter 17 of a power generating plant 1 via data connections 7, 8. The energy management device 20 or energy management box 12 controls the control device 27 of the charging device 3 appropriately for charging the electric vehicle 11. Based on a current value measured by the electricity meter 2, the energy management box 12 controls the specified charging currents $I_{Li}$. Via the charging cable 10, the charging device 3 communicates to the electric vehicle 11 the preset charging current $I_{Li}$ determined by the energy management device 20 as the maximum current amplitude that the electric vehicle 11 may draw. Based on the current value measured by the electricity meter 2, the energy management box 12 informs the inverter 17 whether energy should be charged to an energy storage 5 that may be present, or whether energy should be supplied from the energy storage 5 into the power supply grid 6, or whether energy generated by the photovoltaic modules 4 should be fed into the power supply grid 6. A wireless remote controller 14 can be optionally provided for remote control of the charging device 3. The wireless control is carried out via the energy management box 12 as the energy management device 20.

Figure 3:
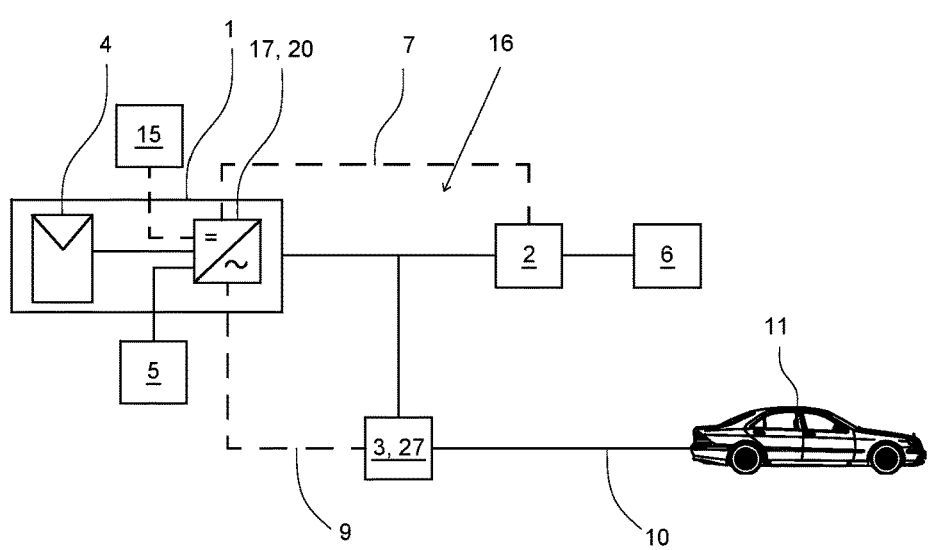
FIG. 3 a block circuit diagram of a second design of a device for charging an electric vehicle in a domestic mains supply.

In the design variant according to FIG. 3, the energy management device 20 is formed by the inverter 17 of a photovoltaic system as the power generating plant 1. The charging device 3 is controlled by the inverter 17 of the power generating plant 1 via a multi-pole control cable 9. Via a charging cable 10, the charging device 3 communicates to an electric vehicle 11 the preset charging current $I_{Li}$ determined by the energy management device 20 as the maximum charging current the electric vehicle 11 may draw. The inverter 17 can be connected to an electricity meter 2 via a data link 7. Based on the current value measured by the electricity meter 2, the energy management box 17 as the energy management device 20 decides whether the power generating plant 1 should charge an energy storage 5 that may be present, or whether the latter should supply energy from the energy storage 5 into the power supply grid 6, or whether energy generated by the photovoltaic modules 4 should be fed into the power supply grid 6. A wired remote controller 15 can be optionally provided to provide remote control of the charging device 3.

Figure 4:
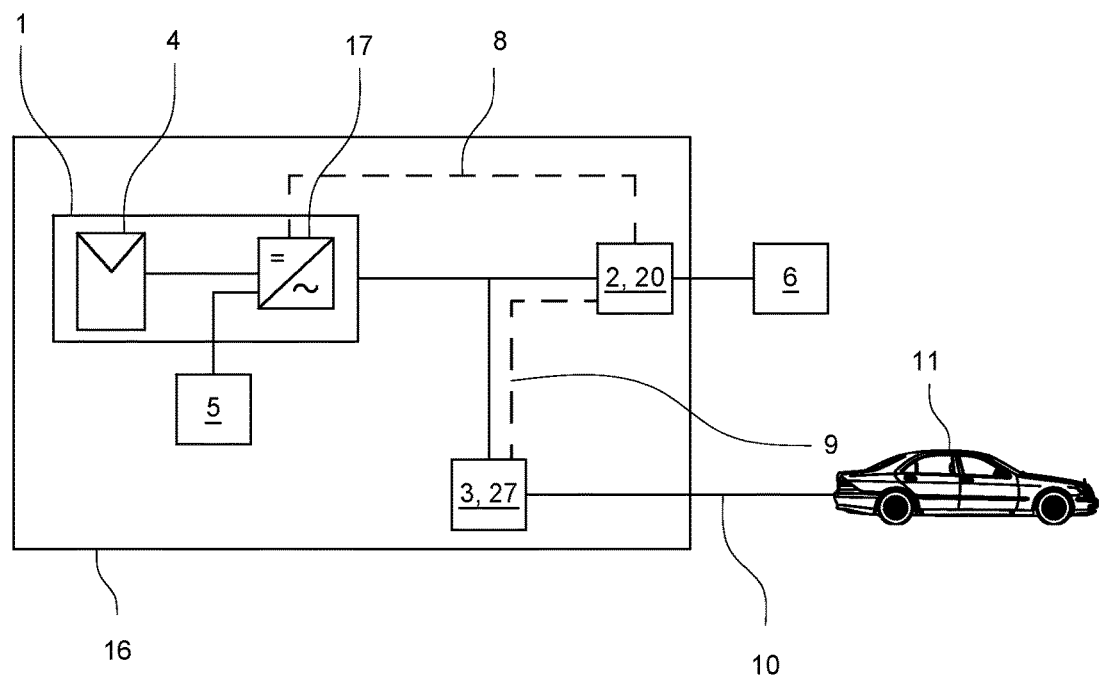
FIG. 4 a block circuit diagram of a third design of a device for charging an electric vehicle in a domestic mains supply.

In the variant according to FIG. 4, the energy management device is formed by an electricity meter 2. The charging device 3 is controlled by the electricity meter 2 via a multi-pole control cable 9. Via a charging cable 10, the charging device 3 communicates to an electric vehicle 11 the preset charging current $I_{Li}$ determined by the energy management device 20 as the maximum charging current the electric vehicle 11 may draw. The inverter 17 is connected to the electricity meter 2 via a data connection 8. Based on the current value measured by the electricity meter 2, the electricity meter 2 as the energy management device 20 decides whether the power generating plant 1 should charge an energy storage 5 that may be present, or whether the latter should supply energy from the energy storage 5 into the power supply grid 6, or whether energy generated by the photovoltaic modules 4 should be fed into the power supply grid 6.

Figure 5:
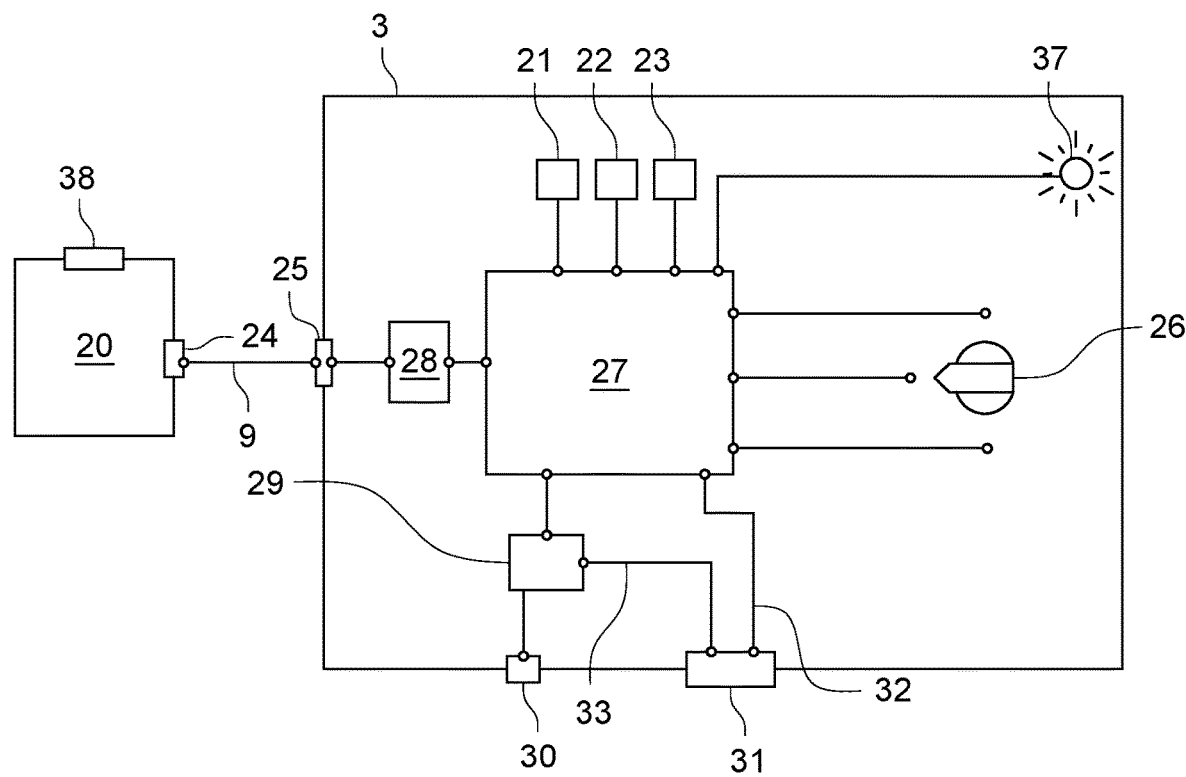
FIG. 5 a block circuit diagram of a charging device with three pre-adjustable charging currents, FIG. 6 a diagram for illustrating an exemplary embodiment of the charging method according to the invention with three preset charging currents.

FIG. 5 shows a block circuit diagram of a charging device 3 with, for example, three adjustment devices 21 to 23 for three pre-adjustable charging currents $I_{Li}$. Only two or more than three adjustment devices 21 to 23 are also possible for setting the charging currents $I_{Li}$. For increased user-friendliness, a second scale can be provided on the adjustment 21 to 23 for presetting the charging currents $I_{Li}$, on which the resulting power according to the set current can be read off. This means that the adjustment can also be made according to the power and the corresponding current value can then be read off without any conversion being necessary.

As described above in FIGS. 1 to 4, the charging device 3 or its control device 27 is controlled by an energy management device 20. A control cable 9 connects the outputs 24 of the energy management device 20 to the inputs 25 of the charging device 3. The controllable outputs 24 of the energy management device 20 can be, for example, the digital outputs of an inverter 17 of a photovoltaic system or wind turbine. The energy management device 20 can also comprise corresponding inputs 38. The control signals are transmitted from the inputs 25 of the charging device 3 to the control device 27 via an optional interface 28. The interface 28 serves the purpose of establishing compatibility between the various possible outputs 24 of an energy management device 20 and the control device 27 of the charging device 3. The corresponding charging currents $I_{Li}$, in this case three charging currents $I_{Li}$, $I_{L2}$ and $I_{L3}$, are preset initially during the installation of the charging device 3 using the adjusting devices 21 to 23 and read out by the control device 27.

An optional changeover device 26 can be connected to the control device 27 for selecting different operating modes. The selected operating mode is detected by the control device 27. The changeover device 26, for example a touch panel, a key-operated switch, a lockable rotary switch, etc., enables switching between, for example, three operating modes:

1. Energy management control
2. Immediate charging
3. Charging stop

In order to implement the economic charging according to the invention, the changeover device 26 is set to the first operating mode "Energy management control". For this operating mode, it is possible to set a gradation consisting of several charging currents $I_{L1}$ on the charging device 3, for example between 6 A and 32 A. For the fastest possible charging of the electric vehicle 11 without regard to the current power generated by the power generating plant 1, the charging device 3 is switched over to the second operating mode "Immediate charging" using the changeover device 26 as required. Any consideration of the information provided by the energy management device 20 is ignored here and the charge with the highest charging current is communicated to the electric vehicle 11. The third operating mode "Charging stop" is suitable for disabling the charging device 3, among other functions. In this case the supply of energy for the electric vehicle 11 in the charging device 3 is deactivated. This is particularly advantageous for a charging device 3 which is installed in an area freely accessible to third parties. In the case of a key-operated switch as the changeover device 26, for safety reasons the key can preferably be removed in any position. In the case of a touch panel as the changeover 26, for example, a code request can be provided to protect against unauthorized startup.

The control device 27 evaluates the control signals, the preset charging currents $I_{L1}$, $I_{L2}$ and $I_{L3}$, and the selection of the operating mode on the changeover device 26 and communicates a corresponding charging current $I_L$ to the electric vehicle 11 (see FIGS. 1 to 4) via a communication line 32, the charging connection 31 and a charging cable 10 (see FIGS. 1 to 4). Furthermore, the control device 27 can control a switch 29 and a status light 37 accordingly. Different colours and illumination intervals of the status light 37 allow statements to be made about the current status of the charging device 3 (e.g. "Standby", "Establishing connection", etc.). The switch 29 activates or deactivates the power supply or current flow via the power lines 33 for the charging connection 31. The charging device 3 is connected to the domestic mains supply 16 via the connection 30 (see FIGS. 1 to 4).

Figure 6:
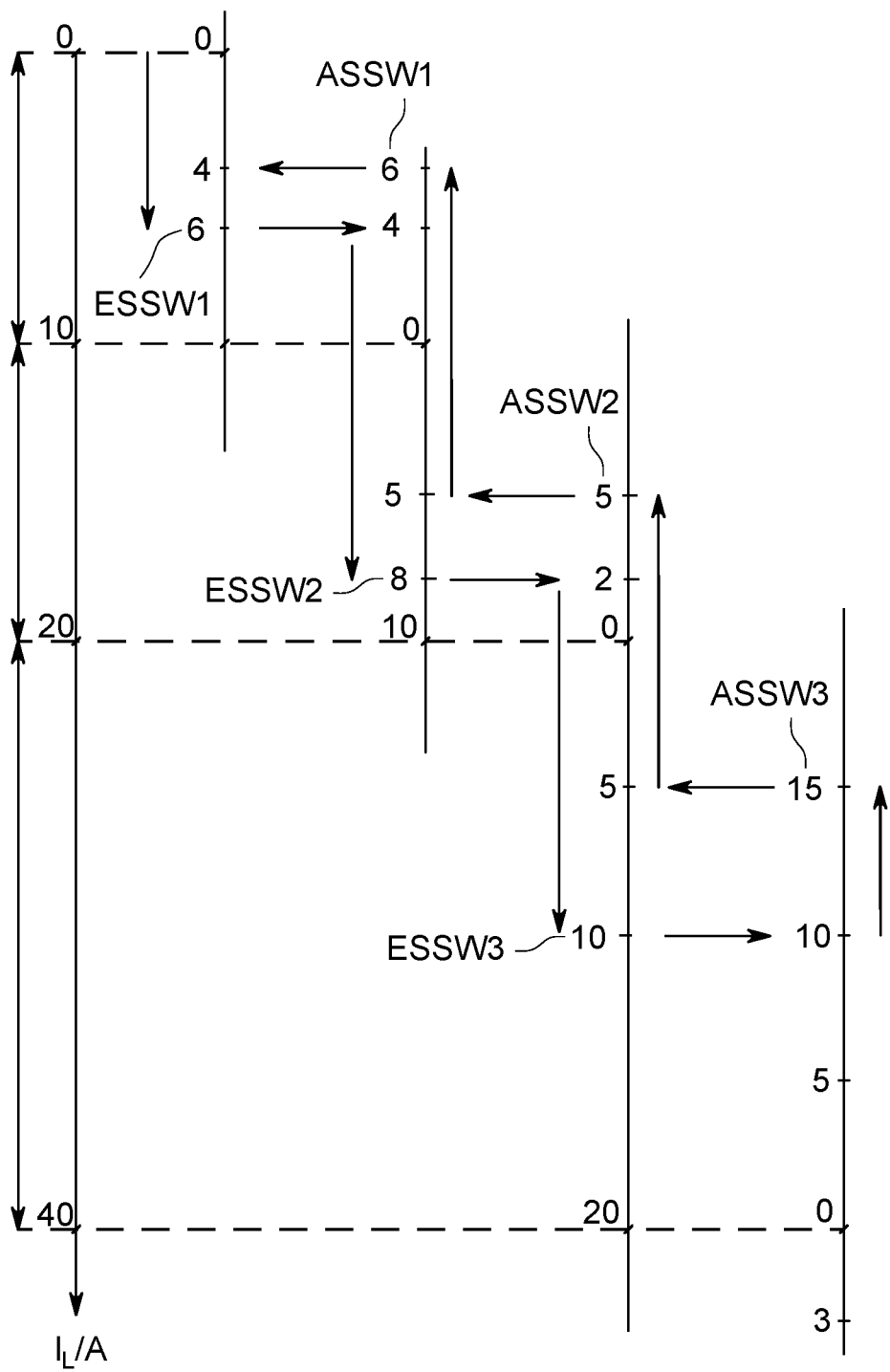

FIG. 6 shows a diagram illustrating an example of the charging process according to the invention with three preset charging currents $I_{Li}$ in a domestic mains supply 16 connected to a power supply grid 6. The preset charging currents $I_{L1}$, $I_{L2}$ and $I_{L3}$ are plotted along the vertical current axis $I_L/A$.

The current (energy or power) supplied or drawn is plotted on the vertical "infeed axes" parallel to the current axis $I_L/A$. Assuming a continuous increase in the current infeed starting at 0 A with the supply of energy from the charging device deactivated, the path followed starts at the zero point of the first infeed axis and moves downwards with increasing feed-in power until the first activation threshold value ESSW1 (=6 A) is reached or exceeded (for simplicity, the following text refers only to exceeding it). After the first activation threshold value ESSW1 has been exceeded, the first preset charging current $I_{L1}$=10 A is activated. For the sake of simplicity, it is assumed in the following that an electric vehicle 11 connected to the charging device 1 always draws the maximum permissible charging current communicated to the electric vehicle 11 by the charging device 1, and no less. Due to the first preset charging current $I_{L1}$=10 A now drawn from the electric vehicle 11, the feed-in current of 6 A changes at this point to a current extraction of 4 A, which is illustrated by the displacement of the infeed axis by 10 A in the next vertical line (second infeed axis). The zero point of the second infeed axis now corresponds to 10 A of the axis $I_L/A$.

If the generated energy or the generated current of the power generating plant 1 increases further until the second activation threshold value ESSW2 (=8 A) is exceeded, the second preset charging current $I_{L2}$=20 A is activated and the first preset charging current $I_{L1}$ is deactivated. Due to the charging current of 20 A now being drawn by the electric vehicle 11, the current supply of 8 A changes at this point to a current extraction of 2 A, which is illustrated by displacement of the infeed axis by a further 10 A in the next vertical line (third infeed axis). The zero point of the third infeed axis now corresponds to 20 A on the axis $I_L/A$.

If the generated energy or the generated current of the power generating plant 1 increases further until the third activation threshold value ESSW3 (=10 A) is exceeded, the third preset charging current $I_{L3}$=40 A is activated. Due to the charging current of 40 A now being drawn by the electric vehicle 11, the current supply of 10 A changes at this point to a current extraction of 10 A, which has been illustrated by a further displacement of the infeed axis (fourth infeed axis). The zero point of the fourth infeed axis now corresponds to 40 A on the axis $I_L$/A.

From this point onwards, for further explanation it is assumed that the energy generated by the power generating plant 1 is continuously decreasing, as illustrated by the upward pointing arrows in the vertical lines.

If the third deactivation threshold value ASSW3 (=15 A) is exceeded, the third preset charging current $I_{L3}$=40 A is deactivated and the second preset charging current $I_{L2}$=20 A is activated. Due to the charging current of 20 A now being drawn by the electric vehicle 11, the current extraction of 10 A changes at this point to a current supply of 5 A, and we now jump back to the left to the third vertical infeed axis.

If the generated energy continues to decrease, the second deactivation threshold value ASSW2 (=5 A) is exceeded and the second preset charging current $I_{L2}$=20 A is deactivated and the first preset charging current $I_{L1}$=10 A is activated. Due to the charging current of 10 A now being drawn by the electric vehicle 11, the current extraction of 5 A changes at this point to a current supply of 5 A, and we move over to the second infeed axis.

If the energy or power generation continues to decrease, the first deactivation threshold value ASSW1 (=6 A) is exceeded and the first preset charging current $I_{Li}$=10 A is deactivated and no other preset charging current is activated. As the electric vehicle 11 is now no longer drawing a charging current, the current extraction of 6 A changes to a current supply of 5 A, and we move over to the second infeed axis).

Using this example of a charging controller with three pre-settable charging currents $I_{Li}$, it can be seen that the energy management aims to consume self-generated energy as far as possible (owner consumption) and to avoid the extraction of energy from the power supply grid 6 (grid extraction) within reasonable limits.

Figure 7:
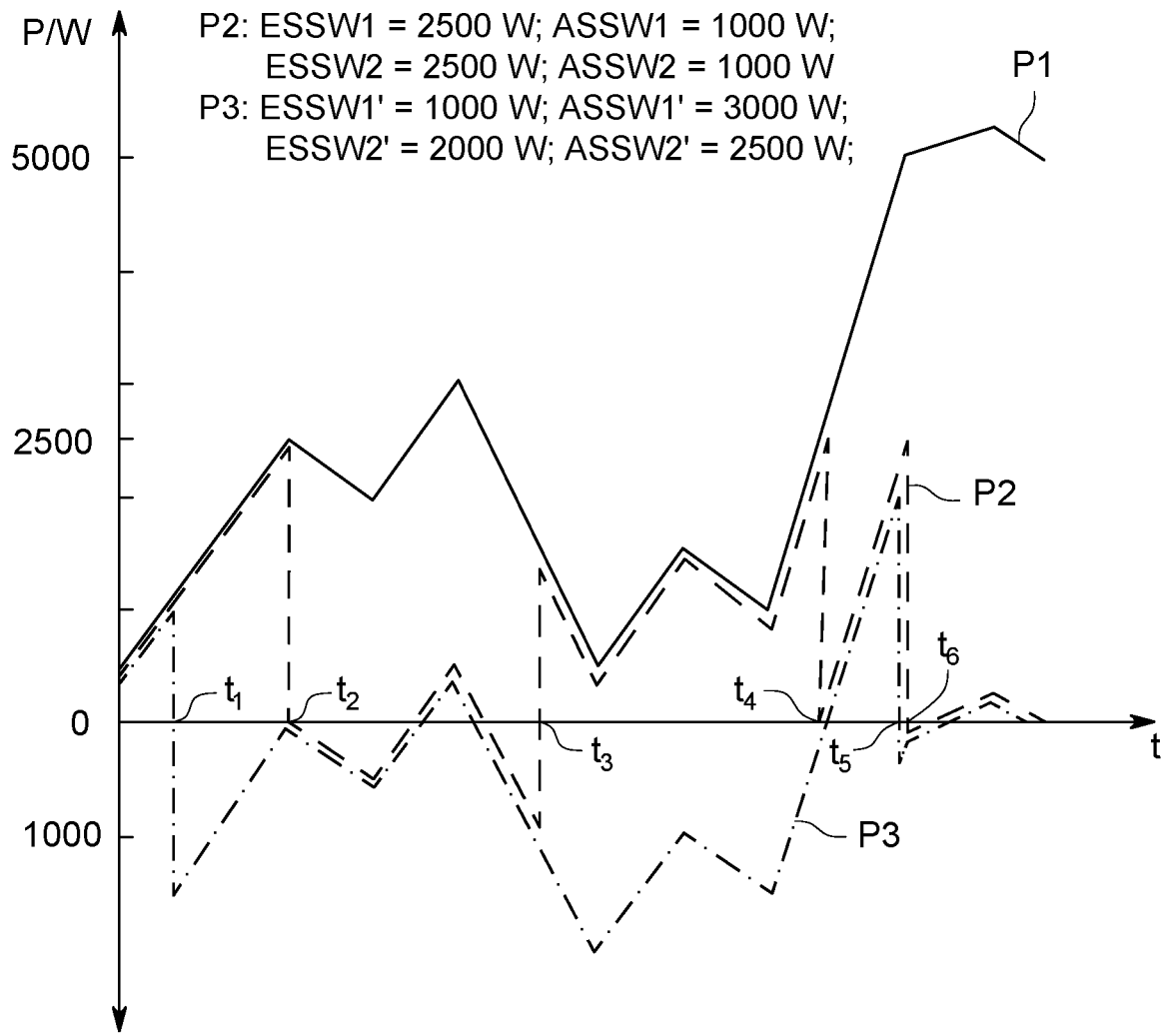
FIG. 7 the temporal profile of the power at the connection point between the domestic mains supply and a power supply grid using the charging method according to the invention.

FIG. 7 shows an example of an energy management process according to the invention based on the temporal profile of the power P at the connection point between the domestic mains supply 16 and the power supply grid 6 as a function of time t for an example time segment. The diagram contains three different power characteristics P1, P2, and P3. A power P above the time axis t corresponds to an energy infeed into the power supply grid 6, whereas a power P below the time axis t corresponds to a grid extraction, i.e. extraction of power from the power supply grid 6. Due to a partial overlap, the power characteristics P2 and P3 have been slightly vertically shifted for better visibility.

Two charging currents or charging powers are specified in the charging device 3 or the control device 27, namely $P_{L1}$=2500 W and $P_{L2}$=5000 W. Since the voltage of the domestic mains supply 16 is always approximately constant, a maximum permissible charging power can also be set via the preset charging currents $I_{Li}$.

For the sake of simplicity, it is assumed in the following that an electric vehicle 11 connected to the charging device 1 always draws the maximum permissible charging current or power communicated to the electric vehicle 11 by the charging device 1, and no less.

The first power characteristic P1 (solid line) shows the power or energy determined in an example case where the charging device 3 is deactivated for the supply of energy (third operating mode). Depending on the time t, either more or less power or energy is fed into or extracted from the power supply grid 6.

The second power characteristic P2 (dashed line) is a superposition of the first power characteristic P1 in combination with an activated charging device in the "Energy management control" operating mode according to the invention. The activation and deactivation threshold values for the pre-set charging powers PL1 and PL2 are, for example: ESSW1=2500 W; ASSW1=1000 W; ESSW2=2500 W; ASSW2=1000 W. At time $t_2$, the first activation threshold value ESSW1 is reached or exceeded and the first preset charging power $P_{L1}$ is activated. By activating the charge with the preset charging power $P_{L1}$, the power supplied is reduced by some 2500 W to 0 W. At time $t_3$, the first deactivation threshold value ASSW1 is exceeded and the first charging power PL1 is thus deactivated again. As a result the power P is changed to 1500 W of supplied power. At time $t_4$, the first activation threshold value ESSW1 is exceeded again and the first preset charging power $P_{L1}$ is reactivated, thereby changing or reducing the supplied power P back to 0 W. At time $t_6$, the second activation threshold value ESSW2 is exceeded and the second preset charging power $P_{L2}$ is activated, thereby changing or reducing the supplied power P by 2500 W back to 0 W.

The third power characteristic P3 (dash-dotted line) is a superposition of the first power characteristic P1 in combination with an activated charging device in the "Energy management control" operating mode with different activation and deactivation thresholds: ESSW1'=1000 W; ASSW1'=3000 W; ESSW2'=2000 W; ASSW2'=2500 W. At time $t_1$, the first activation threshold value ESSW1' is exceeded and the first preset charging power $P_{L1}$' is activated accordingly. By activating the first preset charging power $P_{L1}$', the supplied power P is reduced to 1500 W grid extraction. At a time $t_5$, the second activation threshold value ESSW2' is exceeded and the associated second preset charging power $P_{L2}$' is activated. By activating the second pre-set charging power $P_{L2}$', the supplied power P changes to 500 W grid extraction.

The activation threshold values ESSWi and deactivation threshold values ASSWi for switching on and off or activating and deactivating the preset charging currents $I_{Li}$ or charging powers $P_{Li}$ can be configured, for example, via a user interface of an energy management device 20, which can also be used to select a comparison with the feed-in or generated power. For each preset charging current $I_{Li}$ or charging power PTA, there is one activation threshold value ESSWi and one deactivation threshold value ASSWi.

The activation threshold values ESSWi are usually used for comparing with the power of a power generating plant 1 which is fed into the power supply grid 6, and the deactivation threshold values ASSWi are usually used for comparing with the power extracted from a power supply grid 6. Optionally, the activation threshold values ESSW can also be compared with the power output produced by the power generating plant 1. This makes sense, for example, if the power generating plant 1 is not connected to a power supply grid 6 or is operated in such a way that no power is fed into the power supply grid 6.

In the main case, in which the deactivation threshold ASSWi is related to grid extraction and the activation threshold ESSWi is related to infeed, the so-called threshold spread is the sum of the activation threshold value ESSWi and the deactivation threshold value ASSWi of the same specified charging current $I_{Li}$, i.e. ESSWi+ASSWi. When specifying the activation and deactivation threshold values, it is preferable to allow for the fact that the threshold spread is greater than the current or power difference between the associated preset charging current and the next smaller preset charging current.

A specific threshold spread can be shifted to any desired position by, for example, increasing the activation threshold value ESSW by a certain amount and decreasing the deactivation threshold value ASSW by the same amount. As a result, a preset charging current is only activated at a higher infeed level and deactivated earlier at a lower grid extraction level. Conversely, the activation threshold ESSWi can also be reduced by a certain amount, while the deactivation threshold ASSWi is increased by the same amount. In doing so, the threshold value spread of ESSWi+ASSWi remains unchanged, except a preset charging current is activated earlier at a lower infeed level and only deactivated at a higher grid extraction. The advantage lies in the fact that the energy management can control the charging device 3 or control device 27 by means of the position of the threshold spread, either for shorter charging times of an electric vehicle 11 by allowing a higher proportion of grid extraction, or for improved utilization of the energy that might be uneconomically fed into a power supply grid 6 from a power generating plant 1. In the case of power generating plants 1 which are subject to seasonal or other predictable fluctuations, or in the case of particular or modified habits in the use of an electric vehicle 11, it may also be advantageous to adapt the position of the threshold spread to these fluctuations and habits for a satisfactory supply of power to the electric vehicle 11. The adaptation is either carried out manually in an energy management device 27 or is preprogrammed in advance. For example, the threshold spread can be set within predefined ranges depending on the season, day of week, weekend, working day, holiday and other possible parameters.

Under special conditions, it may also be practical to define an activation threshold value ESSW for the comparison with an infeed and a deactivation threshold value ASSW for the comparison with an infeed. This makes it possible, for example, to operate the charging device 3 by means of pure grid extraction and to limit power peaks, for which higher tariffs apply.

For the control of the charging device 3 or control device 27, a comparison of the determined power levels is carried out to determine whether the activation and deactivation threshold values are exceeded. It is also possible to define negative threshold values or other values, where during a test a comparison is performed of an infeed or a grid extraction with the threshold values for undershooting of threshold values.

For the sake of simplicity, only the variant with the overshoot is discussed in the following.

The test may show that:
a) no threshold value is exceeded
b) the ESSWi is exceeded
c) the ASSWi is exceeded In case a), the energy management retains the last activated preset charging current.

In case b), the energy management activates the preset charging current associated with this ESSWi and deactivates the last active preset charging current.

In case c), the energy management deactivates the preset charging current associated with this ASSWi and activates a lower preset charging current with a suitable ESSWi. If the ASSWi for the lowest preset charging current is exceeded, the supply of energy in the charging device 3 is disabled. For the lowest preset charging current, it may also be practical to set the associated activation threshold value ESSWi and deactivation threshold value ASSWi such that at least the lowest preset charging current is activated, or is activated at the start of an operating mode. For example, for a continuous slow battery charge, a possibly low level of supply or production of a power generating plant 1 can be used for the charge, instead of feeding this energy into a power supply grid 6.

The invention claimed is:

1. A method for charging an electric vehicle comprising:
   connecting the electric vehicle to a charging current from a domestic mains supply connected to a power generating plant, a power supply grid,
   and an energy management device;
   controlling the charging current for charging the electric vehicle by a control device connected to the energy management device, wherein the charging current is selected from at least first and second preset charging currents preset for the control device, wherein the first preset charging current is less than the second preset charging current, and the electric vehicle is charged with one of the at least first and second preset charging currents controlled by the energy management device;
   defining an activation threshold value and a deactivation threshold value for each of the at least first and second preset charging currents;
   selecting the charging current for charging the electric vehicle from the at least first and second preset charging currents by determining a surplus power of the domestic mains supply and a drawn power drawn from the power supply grid and making a comparison between the surplus power and at least one activation threshold value defined for each of the at least first and second preset charging currents and between the drawn power and at least one deactivation threshold value defined for each of the at least first and second preset charging currents, and
   upon reaching the corresponding activation threshold values or deactivation threshold values, activating or deactivating the corresponding preset charging current, the first preset charging current being activated when based on the comparison a first activation threshold value is reached and being deactivated when based on the comparison a first deactivation value is reached and the second preset charging current being activated when based on the comparison a second activation threshold value is reached and being deactivated when based on the comparison a second deactivation value is reached, wherein a current infeed from the domestic mains supply is used to charge the electric vehicle until the first activation threshold is reached or exceeded.

2. The method according to claim 1, wherein a power supplied to the power supply grid is compared with the activation threshold values and with the deactivation threshold values, and the corresponding preset charging current is activated or deactivated, or the determined amount of the drawn power drawn from the power supply grid is compared with the activation threshold values and with the deactivation threshold values, and the corresponding preset charging current is activated or deactivated.

3. The method according to claim 1, wherein the charging of the electric vehicle is stopped when the determined amount of power drawn from the power supply grid exceeds the deactivation threshold of a smallest preset charging current.

4. The method according to claim 1, wherein the activation of a preset charging current is maintained over a selectable minimum time.

5. The method according to claim 1, wherein a time window is set and wherein the charging current for charging the electric vehicle is supplied according to one of the at least first and second preset charging currents in a manner that takes the set time window into account.

6. The method according to claim 1, wherein an operating mode is changed to one in which the electric vehicle is charged with a fixed predefined charging current and/or to an operating mode for deactivating the supply of power.

7. The method according to claim 1, wherein the controller of the charging current for charging the electric vehicle is controlled remotely.

8. A device for charging an electric vehicle with a charging current, comprising:
- a connection for connecting to a domestic mains supply connected to a power generating plant, a power supply grid, and an energy management device;
- a charging connection 414 for connecting to the electric vehicle to be charged;
- a control device for controlling the charging current for charging the electric vehicle; and
- at least one device for determining a surplus power of the domestic mains supply and a drawn power drawn from the power supply grid and for making a comparison between a surplus power of the domestic mains supply and at least one activation threshold defined for each of at least first and second preset charging currents and between the drawn power and at least one deactivation threshold value defined for each of the at least first and second preset charging currents, the first preset charging current being less than the second preset charging current;

wherein the control device is designed to connect to the energy management device;

wherein the control device is configured to select from the at least first and second preset charging currents the charging current for charging the electric vehicle upon reaching the corresponding activation threshold values or deactivation threshold values, by activating or deactivating the corresponding preset charging current, the first preset charging current being activated when based on the comparison a first activation threshold value is reached and being deactivated when based on the comparison a first deactivation value is reached and the second preset charging current being activated when based on the comparison a second activation threshold value is reached and being deactivated when based on the comparison a second deactivation value is reached, wherein a current infeed from the domestic mains supply is used to charge the electric vehicle until the first activation threshold is reached or exceeded.

9. The device according to claim 8, wherein a changeover device is provided for switching over to an operating mode for charging the electric vehicle with a fixed predefined charging current and/or to an operating mode for deactivating the supply of power.

10. The device according to claim 8, wherein the control device is designed for connecting to an inverter of a photovoltaic system, which forms the energy management device.

11. The device according to claim 8, wherein the control device is designed for connecting to an electricity meter which forms the energy management device.

12. The device according to claim 8, wherein a device is provided for selecting a time window so that the charging current for charging the electric vehicle is supplied taking the selected time window into account.

* * * * *